Sept. 28, 1965 A. FREEMAN 3,208,401
CONVEYOR SYSTEM
Filed Nov. 7, 1963 3 Sheets-Sheet 2
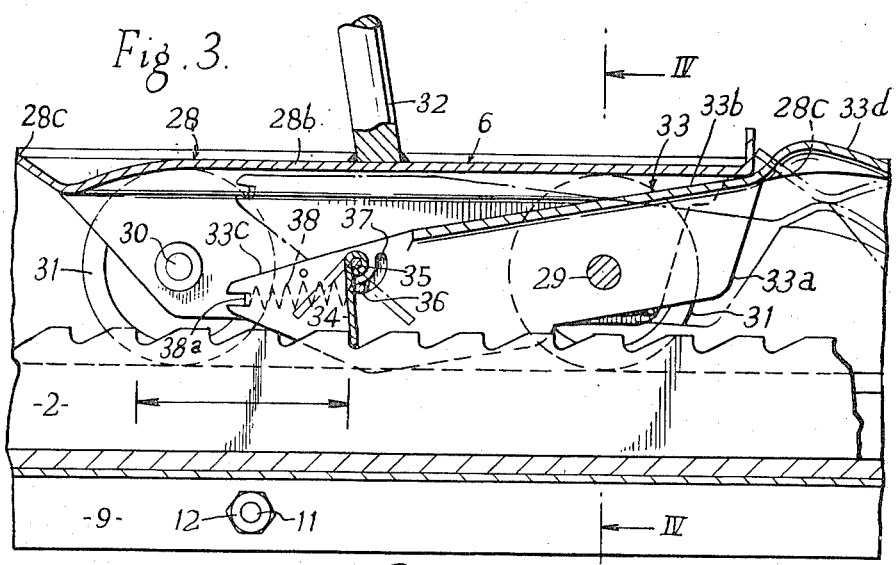
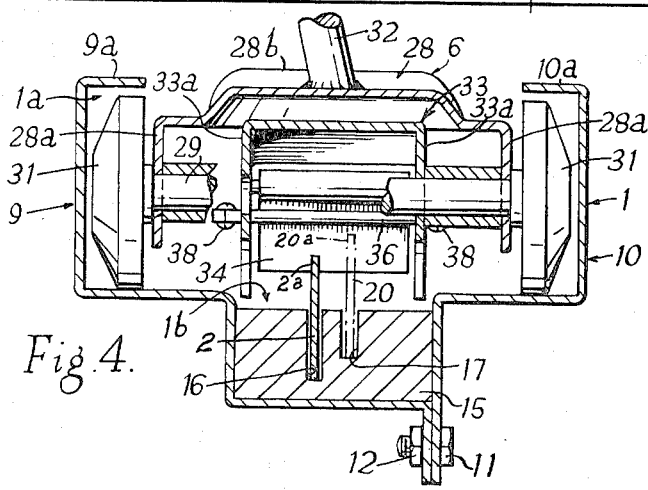
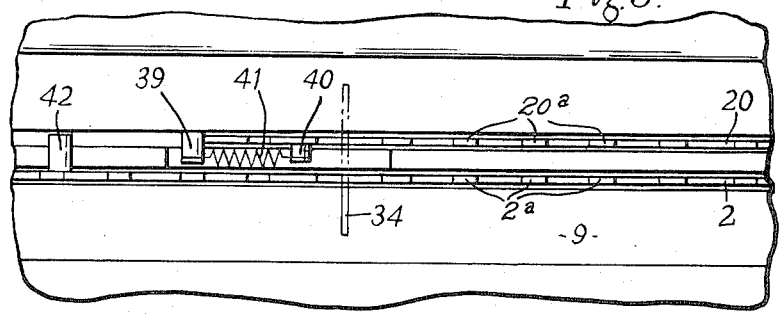

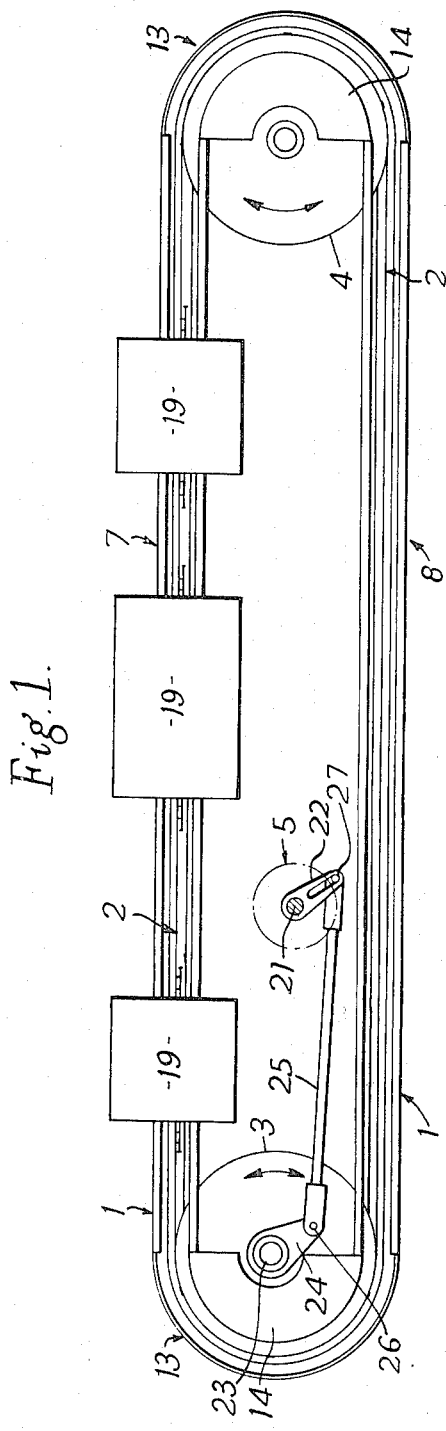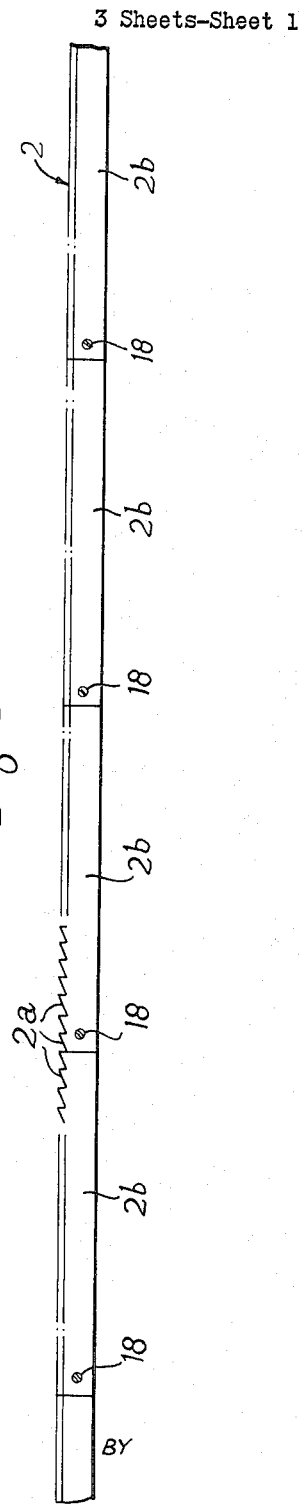

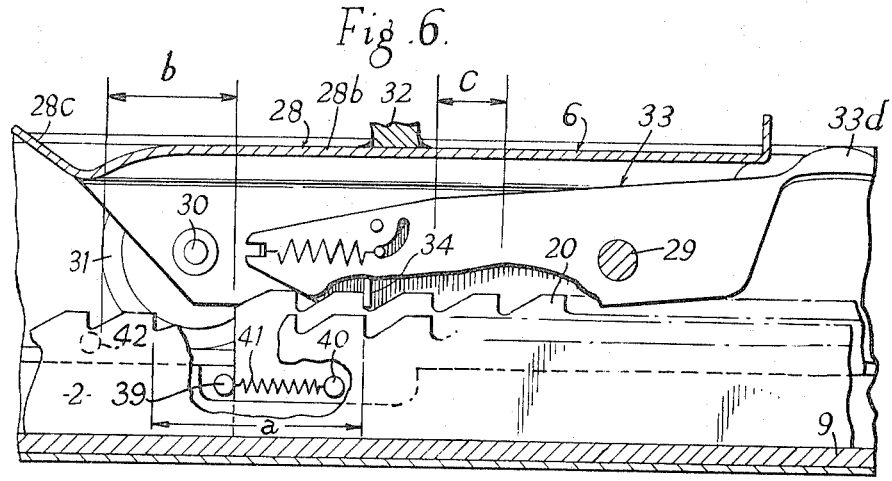
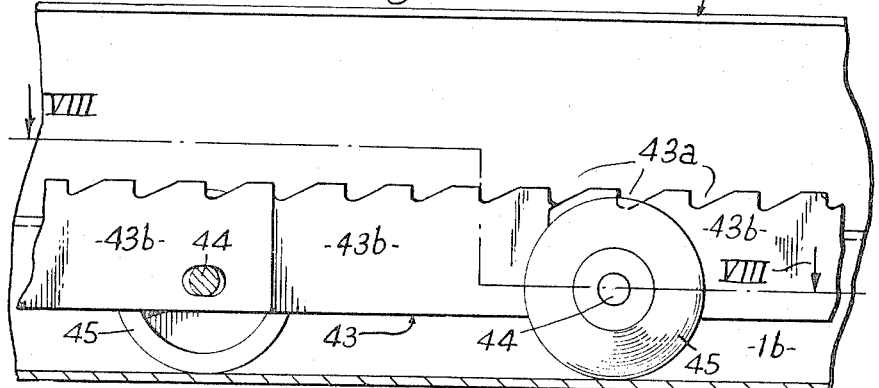
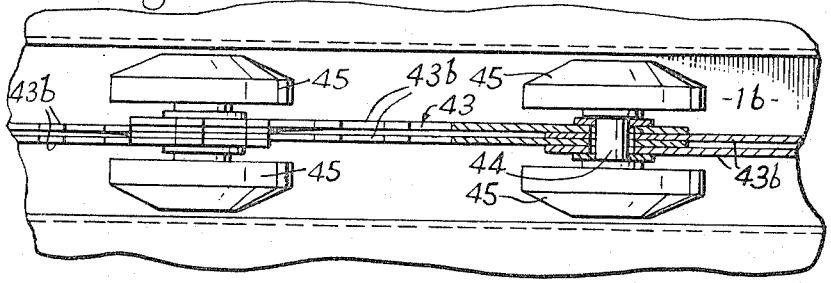

United States Patent Office 3,208,401
Patented Sept. 28, 1965

3,208,401
CONVEYOR SYSTEM
Alfred Freeman, Isham, near Kettering, England
Filed Nov. 7, 1963, Ser. No. 322,119
12 Claims. (Cl. 104—162)

This invention is directed to conveyor systems by means of which work or goods can be transported and of the kind which include a number of work or goods carriers which are arranged to be attached to a travelling driving means to be propelled thereby from one point to another point along the system, the carriers being detachable from the driving means at required times.

The principal object of the invention is to secure a conveyor system of the kind in which the carriers can be moved at contrasted speeds along different sections of the system—a facility which can be of considerable value in many environments, and to meet this desideratum in a simple fashion without complicated equipment, timing gear and so on.

Another object of the invention is to provide a simple, efficient and cheaply produced driving means.

Another object of the invention is to enable the same power unit to drive, if required, the carriers at all parts of the system, even although the relative speeds of passage through the parts may differ. A further object of the invention is to afford the facility for changing the speed of passage at individual parts of the system, without affecting the remainder.

The conveyor system in accordance with this invention comprises a trackway, a plurality of carriers adapted to run along this trackway in guided fashion, a linear driving means with drive elements or abutments at intervals therealong, at least one power unit, and transmission devices for imparting a reciprocatory travel to said driving means from the power unit, said carriers each being equipped with a pivoted catch device serving the function of a pawl and being arranged to cooperate with the said elements or abutments so as to drivingly couple each carrier to the linear drive means when the latter is traveling in one direction, but to be automatically by-passed by the said elements or abutments when the drive means is traveling in the opposite direction.

The principle on which the system will work is that loaded carriers will be placed on the trackway with the catches normally in position for engagement with the elements or abutments on the linear driving means, which is continuously reciprocated. During the forward stroke of the linear driving means, there is a positive coupling between the catch device and corresponding driving element which moves the carrier concerned forward at the same speed of travel as the cable or like driving means. When, at the end of a forward stroke, the cable or the like reverses, it returns idly, leaving the carrier standing until the following reversal of the cable drive once again to the forward motion. It will therefore be appreciated that each carrier will travel forwards at a predetermined speed in steps of a predetermined length.

By arrangement of a deflector means, e.g. ramps or pivoted blades, in the path of travel of the catch devices on the carriers, these can be automatically uncoupled at appropriate places along the system and the carrier freed from impulsion by the cable or the like.

Similarly, the arrangement may be such that should a carrier abut against any preceding stationary carrier, making it necessary for the first-mentioned carrier to remain stationary until the predecessor is cleared, the catch device of this carrier will be automatically uncoupled to free the carrier from impulsion by the driving means.

In accordance with an important feature of the invention the linear drive means, although in effect travelling in a single path (i.e. a path which is continuous in terms of direction) may be split into sections which may be reciprocated at contrasting individual speeds, even although the individual sections may be operated from the same power unit. It will be appreciated that the carriers can then be handed over from one section of driving means to the next following and be propelled at different speeds along the two adjoining sections by virtue of the differential rate of reciprocatory motion of these sections. Transmission systems of different ratio may be used to impart different motions, from a common power unit, to the different sections.

In an alternative arrangement, the linear drive means may comprise a main part which extends, or a series of main parts which together extend, for the full length of the path of the system, e.g. an endless path, and which is or are adapted to be reciprocated so as to drive carriers at a constant speed throughout the full length of the system, there being provided, in addition, at each of a plurality of zones along said path where carriers are required to be driven at a different speed, an auxiliary part of the linear drive means which is adapted to be reciprocated with a different stroke to that of the main part thereof and which is adapted to take over, from the main part of the linear driving means, the drive to the carriers through said zone. Here again both the main part and the auxiliary parts of the linear driving means are preferably all driven from the same power unit by any appropriate means.

Thus, for example, the ends of one part of a cable or like driving means may be drivingly connected to the outer ends of a lever which is fulcrumed between these points of connection and is rocked back and forth so as to reciprocate the cable or the like at a predetermined stroke. The degree of traverse varies from point to point along the length of the lever away from the pivot point and, by connecting a member, coupled to another and succeeding part of the cable at any appropriate and chosen position along this lever, the further cable part can be reciprocated at a chosen shorter stroke imparting a slower speed to the carriers.

Alternatively, in the second arrangement described above employing auxiliary parts or sections of the driving means, where, as will usually be the case, the requisite speed through each of said zones is less than the speed of drive imparted by the main part of the linear driving means, each of the said auxiliary parts of the linear driving means may conveniently be arranged to be driven from the main part thereof with a lost motion producing the lower stroke of reciprocation.

The carriers may be of any appropriate form, for example, be of a wheeled type or of sled form, or in the nature of trays. The trackway for the carriers can also be of various forms, for example, it may comprise a rail on which the carrier is suspended, a pair of rails on which wheels of the carriers run, or a channel along which the carriers slide or roll. In any event the trackway will be endless or discontinuous according to the particular environment to be served. Again, it may be run horizontally or be inclined to the horizontal at one or more parts, or even throughout its length.

The linear drive means can also take various forms. In perhaps the most elementary case, they may comprise a steel cable, or adjoining sections of steel cable, carrying propelling elements or abutments. These elements or abutments are, for example, in the form of a cylindrical or frusto-conical sleeve which is threaded on the cable, the latter form of sleeve having its larger end leading in the direction of intended travel of the cable.

Conveniently, each propelling element is releasably secured in position on the linear drive means (e.g. cable) so that it can be quickly fastened on the latter, or removed when required, and be shifted to different positions along it, for example to cater for a faster or slower rate of travel of the carriers required at the part of the system concerned.

Another form of drive means is a strip, e.g. of steel, which may run, for example, edge up around the system and be provided with propelling abutments or elements at this upper edge. For example, the strip may be in the form of a type of band saw strip arranged with the teeth upstanding and representing a ratchet arrangement for unidirectional engagement with the carrier catch devices.

The catch devices can be quite simple and, of course, will necessarily suit the particular form of drive means employed.

Conveniently, the linear driving means is disposed below the carriers. In this case the catch device is pivotally mounted upon the carrier and downwardly biased for engagement with the leading face of a propelling element or abutment of the driving means so as to couple the carrier up to the drive means when the latter is travelling in the forward direction.

An advantage of this form of construction is that should the height of a drive means, e.g., a cable, say, vary from point to point along the system, e.g., due to varying cable tautness, this will make no difference to the coupling with the carrier, the position of the pivoted catch device being self-adjusting. The catch device is also preferably of substantial transverse width, to ensure that contact with the individual propelling elements or abutments is maintained despite lateral shifting or twisting of the carrier at different parts of the system.

In one embodiment, the catch device is in the form of a flap, loop or stirrup, which is pivoted at one end to the carrier and is spring-biased downward at its other end for engagement with a driving element or abutment of the driving means during a forward stroke but is movable against the spring action during a reverse stroke to disengage the driving element or abutment.

In an alternative embodiment, the catch device comprises a member pivotably mounted upon the carrier and carrying a transverse blade which is itself pivoted upon the member, the latter being downwardly biased and the blade being so constrained that it can engage a driving element of the driving means during a forward stroke thereof but can pivot relatively to the said member during a reverse stroke to disengage the driving element, the said member having an extremity projecting forwardly of the carrier which is in the form of a ramp which can be engaged, either by the aforesaid deflector means provided in the path of travel or by a preceding stationary carrier, to pivot the member relatively to the carrier and disengage the blade, and hence the carrier from the drive means.

However, in any event, the arrangement is advantageously such that the coupling between the linear driving means and the catch device will be broken when a predetermined load is exceeded suchwise that should a carrier meet an obstruction or otherwise be positively prevented from forward movement, upon the preset load being exceeded as the linear driving means strives to move the carrier, the coupling will be broken and the carrier will remain stationary, this safety arrangement preventing damage to the system and particularly to the drive-transmitting means.

To this end the second of the above-described constructions may be modified, the member being of spring steel and the blade being integral with the member, the resilience of these parts providing the requisite safety arrangement.

In order that the invention may be more clearly understood, one specific constructional example in the form of an endless conveyor system will now be described with reference to the accompanying drawings, wherein:

FIGURE 1 is a diagrammatic plan view of the endless conveyor system,

FIGURE 2 shows, in side elevation, a portion of the endless linear drive means employed in the conveyor system shown in FIGURE 1, FIGURE 3 is a vertical longitudinal sectional view taken through a trolley or carrier (used in the conveyor system shown in FIGURE 1) and through asociated parts of the conveyor system showing the coupling between the trolley or carrier and the linear drive means, FIGURE 4 is a vertical transverse cross-sectional view taken on the line IV—IV of FIGURE 3, FIGURE 5 is a plan view of a portion of the main part or length of driving strip and the adjacent end portion of an auxiliary part or length of driving strip and the drive means therebetween, and FIGURE 6 is a vertical longitudinal sectional view taken through a trolley or carrier and through associated parts of the conveyor system within one of the zones through which the latter travels at a different speed showing the manner in which the carrier is coupled to and driven by the auxiliary drive strip.

FIGURE 7 shows in side elevation a portion of an alternative form of linear drive means, and FIGURE 8 is a plan view, partly in horizontal cross-section, taken on the line VIII—VIII of FIGURE 7.

The illustrated endless conveyor system is destined for use in a boot and shoe factory for transporting shoes, and has (see FIGURE 1), an endless trackway, indicated generally at 1 disposed in a horizontal plane, and comprising two parallel straight runs connected at their ends by curved portions, an endless linear driving means indicated generally at 2 which is guided, within the trackway, and extends around two drums 3 and 4 located adjacent the curved portions of the trackway 1 and is driven by a power unit 5; and a plurality of carriers or trolleys 6, not shown in FIGURE 1 but one of which is shown in FIGURES 3 and 4, which are mounted upon the trackway 1 and guided for movement therealong and have coupling means for engagement with the linear driving means 2 whereby the carriers 6 are driven along the trackway 1 in a manner to be described.

As will be most clearly seen in FIGURES 3 and 4 the trackway 1 is in the form of a steel channel and comprises a main upper channel portion 1a of oblong cross section for accommodating the lower portions of the trolleys or carriers, and, disposed centrally below and in communication with this upper channel portion a lower smaller portion 1b also of oblong cross section accommodating the linear driving means 2. Thus, each of the two parallel straight runs of the trackway (generally designated 7 and 8) are made up of a plurality of sections secured together end to end, each section itself being composed of an outer part 9 and an inner part 10 both of angled profile, as clearly shown in FIGURE 4, which are secured together by bolts 11 and associated nuts 12 and which constitute the opposite sides of the trackway channel and define the two channel portions 1a and 1b. The upper marginal portions of the two parts 9 and 10 are folded inwardly to form two inwardly-directed flanges 9a and 10a. The construction of the trackway 1 at each of its reversing curved portions 13 is modified. Thus, each of these portions 13 comprises an arcuate section of the profiled part 9, whilst the profiled part 10 is omitted to accommodate the periphery of the relevant drum 3 or 4 which is rotatable about a vertical axis and the periphery of which defines, with the arcuate section of the part 9 the small channel portion 1b. Located above and coaxial with each of the drums 3 and 4 is a 180° segment 14 which is fixed in position and the periphery of which defines with the arcuate section of the part 9 the large upper channel portion 1a.

Located at spaced intervals along the lengths of the two straight sections 7 and 8 of the trackway 1 in the small lower channel portion 1b thereof, are small blocks 15 of nylon or similar material which are each formed in the upper portion thereof with a pair of parallel spaced, upwardly-open narrow slots 16 and 17 each of constant narrow ablong cross section, the slot 16 being deeper than the slot 17, as clearly shown in FIGURE 4.

The linear driving means 2 is in this example, as most clearly shown in FIGURE 2 in the form of an endless flexible strip, e.g. of tempered steel. The strip 2 is in the nature of a band-saw strip having a large number of regularly spaced ratchet teeth constituting abutments 2a, the strip running edge up with the teeth upstanding and representing a ratchet arrangement for unidirectional engagement with catch devices provided upon the goods carriers 6 mounted upon the trackway. The strip 2 is constituted by a plurality of equal-sized flexible metal sections 2b which are overlapped at their adjacent ends and secured together by rivets 18.

The portions of the strip 2 located within the curved portions 13 of the trackway 1 are secured, by means of the relevant ones of the rivets 18, to the peripheries of the two drums 3 and 4. The portions of the strip 2 located within the curved portions 13 of the trackway require great flexural strength and may be reinforced by additional strip sections 2b. The portions of the strip 2 extending along the straight sections 7 and 8 of the trackway are located in the narrow slots 16 in the blocks 15 in these sections, which slots are of a size to receive the strip 2 for longitudinal sliding movement therein.

Now, at zones, three of which are indicated at 19 in FIGURE 1, along the trackway the carriages are intended to be driven at a different speed to that at which they travel along other sections of the system. For this purpose an additional short finite length of strip designated 20 is provided, in each of these zones 19, alongside the main driving strip 2 and is located in the other, shallow slot 17 in each of the relevant ones of the blocks 15 within the portion of the trackway in these zones and takes over from the strip 2 the drive of the carriages 6 through these zones, as will be described below.

Of the two drums 3 and 4, both of which are turnable about vertical axes, the drum 4 is freely turnable whilst the drum 3 is driven from the power unit 5. This unit in this example is constituted by an electric motor (not shown) arranged to drive a reduction gearbox the output shaft 21 of which is vertically disposed and rigidly carries a radially extending arm 22. The shaft 23 rotatably supporting the drum 3 also carries a radially extending arm 24. A link 25 is pivotally attached at one end to the arm 23 by means of a pivot pin 26 and is pivotally attached at the opposite end to the arm 22 by means of a pivot pin 27. The arrangement is such that, with the conveyor system in operation, the power unit 5 drives the shaft 21 and arm 22 slowly and continuously in one direction and this causes, through the link 25, the arm 24, and the drum 3, to be oscillated with a stroke which is constant but adjustable. Thus, the linear driving strip 2 secured to the drum 3 has a reciprocatory motion continuously imparted to it. The stroke of the driving strip 2 may be adjusted by varying the position of the pivot pin 27 radially along the arm 22, in known fashion.

Each of the carriers or trolleys, indicated generally at 6, in FIGURES 3 and 4, comprises a body 28 in the form of an inverted metal channel, the sides or limbs of which are designated 28a and the bridge portion of which is designated 28b, the length of which extends in the direction of movement of the trolley. Mounted respectively on axles 29 and 30 located respectively adjacent the front and rear ends of the body 28 are two pairs of rollers or wheels 31 which run along the main channel portions 1a of the trackway 1, there being a small clearance between these rollers or wheels and the flanges 9a and 10a on the parts 9 and 10 of the trackway channel. Each of these flanges serves as a control, and possibly a running surface, in the event of heavy unilateral loading of the trolley 6 at the opposite side. The outer surfaces of the wheels 31, i.e. the surfaces remote from one another and running against the side defining the channel portion 1a of the trackway are peripherally tapered. It is to be noted that there are no flanges corresponding to 9a and 10a at the curved portions 13 of the trackway so that the trolleys 6 can be lifted from or placed in, the latter at these curved portions.

Each of the trolleys 6 may be equipped with work holding means of the many types familiar in the boot and shoe industry. The illustrated carrier 6 is equipped with a single upstanding jack pin 32 which is inclined somewhat from the vertical and is intended to receive the heel of a sole-up last.

Pivotally mounted upon the front axle 29 of the trolley 6 is the main elongated member 33 of a catch device which is of narrow inverted channel form in cross section the sides or limbs thereof being designated 33a and the bridge portions being designated 33b. This member 33 is mounted adjacent its leading end upon the axle 29 so that the rear end portion 33c thereof is downwardly urged under the action of gravity. Mounted within the channel at the rear end portion 33c of the member 33 is a transverse blade 34 which is rolled over at its upper extremity so as to enclose, and pivotally mount the blade upon, a spindle 35 extending between the two sides 33a of the member 33. This blade 35 is normally located in the position shown in FIGURES 3 and 4, i.e. in a plane perpendicular to the plane of the bridge portion 33b of the channel of the member 33 but the blade is turnable about the spindle 35.

Thus, the blade 34 is freely turnable rearwardly about the spindle 35 but is normally prevented from forward turning movement by reason of its abutment with a transverse rod 36 which is engaged in a pair of aligned 90° arcuate slots 37 formed in respectively opposite sides 33a of the channel of the member 33, this rod 36 being urged towards the lower rearward ends of the slots 37 as shown in FIGURE 3 by means of two tension springs 38 interposed between the opposite ends of the rod 36 and anchorages 38a provided at the rear end of the member 33. However, the blade 34 is turnable, against the action of the springs 38, forwardly about the axis of the spindle 35 into a position adjacent the bridge portion 33b of the channel section catch member 33.

When the carrier or trolley 6 is placed upon the trackway 1 the rear end 33c of the coupling or catch member 33 pivots downwardly for a sufficient distance (the movement being limited by abutment of the forward end portion of the member 33 against the underside of the bridge portion 28b of the body of the trolley) so that the lower end of the blade 34 engages in a notch between adjacent teeth 2a on the driving strip 2. Manifestly during the forward stroke of the reciprocating drive strip 2, i.e. movement in the direction from left to right as viewed in FIGURE 3, there is a positive coupling between the relevant tooth and the blade 34 which moves the carrier forward at the same speed of travel as the driving strip 2. When at the end of the forward stroke the driving strip 2 reverses, it returns idly, the blade 34 freely turning rearwardly about the spindle 35, leaving the carrier 6 standing until the following reversal of the drive to the driving strip 2 once again to the forward motion when the blade 34 is again engaged. Thus, as the driving strip 2 is reciprocated the trolleys 6 are advanced in steps along the trackway 1.

Should one of the carriers 6 meet an obstruction upon initiation of the preset loading of the springs 38, which normally prevent forward turning of the blade 34 about the spindle 35, the blade 34 will turn forwardly to disengage the blade from the teeth of the driving strip 2. Thus, the coupling will be broken and the carrier 6 will remain stationary.

Moreover, the forward extremity 33d of the bridge portion 33b of the member 33 which extends beyond the front of the body 28 of the carrier 6 is so shaped as to constitute a forwardly and downwardly inclined ramp which can be engaged by the correspondingly shaped rearward extremity or tail 28c of the body 28 of a stationary carrier 6 in the path of travel of the carrier under consideration (as shown in dotted lines in FIGURE 3) thereby pivoting the member 33 clockwise as viewed in this figure about the front axle 29 into the position shown in dotted lines in FIGURE 3 so that the blade 34 is lifted out of engagement with the teeth 2a of the driving strip 2 and the carrier 6 under consideration is also brought to a standstill.

Moreover, deflector means, e.g. fixed or retractible blades (not shown) may be arranged along the trackway 1 at positions where it is required to arrest trolleys 6 and leave them arrested, such means each being adapted to engage the said ramp 33d and turn the member 33, as described above, to retract the blade 34 from the driving strip 2.

The manner in which the carriers 6 are driven through each of the zones 19 will now be described, the arrangement being generally the same in each zone. As will be seen from FIGURES 4 and 6 the auxiliary strip 20 in the illustrated zone 19 is of the same width or depth as the main strip 2 but since the strip 20 is located in slot 17 in each of the blocks 15, which is shallower than the slot 16 therein, the upper edge of the strip 20 is located above the upper edge of the strip 2. Thus, the propelling abutments 20a of the strip 20 are located above the propelling abutments 2a of the main strip 2 thus lifting the relevant edge of the blade 34 out of engagement with the abutments 2a, the member 33 turning about the axle 29, so that the blade is in engagement with the abutment 20a and the carriage can only be driven by the auxiliary strip 20 through the zone 19.

In the present example it is required that the carriers be driven through the zones 19 at a lower speed than that at which they travel around the other parts of the system and the strip 20 in each zone is accordingly adapted to be driven from the main strip 2 with some lost motion. Thus, a laterally-extending bolt or stud 39 is provided upon the side of the trackway and the end of the auxiliary strip 20 normally abuts against this stud. A tension spring 41 is interposed between the stud 39 and a stud 40 projecting laterally from the strip 20 adjacent the end thereof so that the latter is normally urged into contact with the stud 39. Provided upon the strip 2 is a further stud 42 which is located above the level of the stud 39 and which is adapted to abut against the end of the strip 20 upon a forward stroke of the strip 2 and thereby impart a small forward stroke to the strip 20.

The stroke of the main drive strip 2, indicated at a in FIGURE 6, is equal to the length occupied by three adjacent ones of the spaced abutments 2a. In the initial position of the drive strip 2 the stud 42 is spaced from the end of the strip 20 a distance, indicated at b, equal to approximately the length occupied by the two adjacent ones of the abutments 2a. Thus, there is a lost motion equal to the length b between the strip 20 and the strip 2 and a small increment of motion c is applied to the strip 20 at each stroke of the strip 2.

Now the trackway 1 of the conveyor system described above with reference to FIGURES 1 to 6 of the accompanying drawings is located in a common plane, in fact a horizontal plane, and accordingly the driving strip 2 only requires to move in a horizontal plane. Thus, the drive strip 2 merely requires to flex in one direction and the aforesaid sections 2b are rigidly secured together by the rivets 18 so that the sections cannot turn about the axes of the rivets 18. However, some conveyor systems require to negotiate inclines, etc., and in this case a linear driving means of an alternative form to that used in the systems shown in FIGURES 1 to 6 must be used. One example of a drive means for use in such a case will now be described with reference to FIGURES 7 and 8.

As will be seen the linear driving means of this alternative form is again in the form of a strip designated 43 and is basically the same as the strip 2 in FIGURES 1–6 having teeth 43a. This strip 43 is intended for use in a conveyor system of the same general form as shown in FIGURES 1–6 but in which portions of the trackway 1 are inclined from the horizontal. In this event the strip 43 would be of endless form. Moreover the strip 43, like the strip 2, is made up of sections 43b which overlap and are connected together. However, the sections 43b are double, there being two adjacent sections and these are in this case connected, not rigidly by rivets but by means of pivot pins 44 which allow relative turning of the strip sections 43b about the axes of the pins 44 so that the strip 43 may negotiate inclined portions of the trackway.

Now in a conveyor system as described with reference to FIGURES 5 and 6, having zones through which the carriers are driven at speeds different to that at which the carriers are driven between these zones, the main strip may be in the form of the strip 43 described above, whilst the auxiliary strip may also be of this form or, where the whole length of the zone is located in a common plane, may be in the form of the strip 2 described with reference to FIGURES 1–6.

Alternatively, in a conveyor system wherein the carriers are driven at constant speed throughout the length of the system a single length of drive strip 43 may be used and the blocks 15 previously described may be dispensed with and there may be attached to each pin 44, or selected ones of the pins 44, a pair of wheels 45 flanking the strip 43, these pairs of wheels 45 being arranged to run along the channel 1b of the trackway 1. Manifestly when the strip 43 is to be driven in the same manner as the strip 2 in the example shown in FIGURES 1–4, the wheels 45 will be omitted at the portions of the strip attached to the drums 3 and 4.

I claim:

1. A conveyer system comprising, in combination, a trackway, a plurality of sections of linear drive means extending along respective portions of said trackway, each of said sections having drive elements regularly spaced therealong, means for effecting different strokes of reciprocatory travel to each respective drive means, and a plurality of carriers adapted to run along said trackway in guided fashion and each having a pivoted catch device arranged to co-operate with the said drive elements, whereby when each section of said linear driving means is travelling in one direction at least one of said carriers may be coupled thereto by co-operation of the catch device thereof with one of said drive elements for travel through the stroke of said section and when each section of said drive means is travelling in the opposite direction the catch device thereof is released from the relevant drive element and the carrier is by-passed by the latter, and the carriers are driven at different speeds along portions of said trackway associated with said different sections of linear drive means.

2. A conveyor system according to claim 1, wherein each of said carriers is furnished at the rear thereof with means for acting upon and uncoupling from the drive means the catch device of a succeeding carrier on the trackway, whereby should a carrier abut against any preceding stationary carrier the catch device of said first-mentioned carrier will be automatically uncoupled from the drive means.

3. A conveyer system comprising, in combination, a trackway, at least two elongated drive strips extending along said trackway and having ratchet teeth regularly spaced along one edge thereof, means for effecting different strokes of reciprocatory travel respectively to at least two of said drive strips, and a plurality of carriers adapted to run along said trackway in guided fashion, each carrier having a pivoted catch device arranged to co-operate with the said teeth, and means for selectively positioning each of said drive means to engage the pivoted catch device on said carriers at intervals along the trackway, whereby when the said strip is travelling in one direction each carrier is coupled thereto by co-operation of the catch device thereof with one of said teeth and when the strip is travelling in the opposite direction the catch device is released from the relevant tooth and the carrier is by-passed by the latter.

4. A conveyer system according to claim 3, wherein said strip is of hard flexible material and has guide wheels rotatably secured to the flat side thereof.

5. A conveyer system according to claim 3, wherein said strip comprises a plurality of sections which overlap one another and which are rigidly connected together by means of rivets so that the sections cannot turn about the axes of the rivets.

6. A conveyer system according to claim 3, wherein a plurality of bearing blocks are provided at intervals along the trackway, these blocks being formed with slots which are upwardly open, the lower marginal edge portion of the linear driving strip being engaged within said slots in said blocks and being supported by the latter for sliding therein during reciprocatory travel.

7. A conveyer system according to claim 3, wherein said track-way is of channel cross-section and said strip constituting the linear driving means comprises a plurality of sections which overlap one another and which are connected together by pivot pins allowing relative turning movement of the strip sections about the axes of the pins, there being mounted upon each of selected ones of the pins a pair of wheels flanking the strip and which are arranged to turn within a channel of the trackway.

8. A conveyer system comprising, in combination, a trackway, a plurality of sections of elongated flexible strips extending along respective portions of said trackway, each of said sections being formed with ratchet teeth regularly spaced along one edge thereof, means for imparting different strokes of reciprocatory travel to at least two of said flexible strips and a plurality of carriers adapted to run along said trackway in guided fashion and each having a pivoted catch device arranged to co-operate with the said teeth, whereby when each of said strip sections is travelling in one direction at least one of said carriers can be coupled thereto by co-operation of the catch device thereof with one of said teeth for travel through the stroke of said strip section and when said strip section is travelling in the opposite direction the catch device thereof is released from the relevant drive element and the carrier is by-passed by the latter, and the carriers are driven at different speeds along portions of the trackway associated with said different strip sections.

9. A conveyer system comprising, in combination, a trackway, a linear drive means extending along and below the upper part of said trackway and having drive elements regularly spaced therealong, means for effecting different strokes of reciprocatory travel to said respective drive means, and a plurality of carriers adapted to run along said trackway in guided fashion and each having a pivoted catch device comprising a member pivotally mounted upon the carrier for turning movement upwardly and downwardly upon the latter and being normally constrained downwardly, and a transverse blade pivotally mounted upon said member adjacent one end thereof and normally constrained into a position for engagement with said drive elements on said drive means, whereby when the said drive means is travelling in one direction each carrier is coupled thereto by co-operaiton of the catch device thereof with one of said drive elements and when the drive means is travelling in the opposite direction the blade can pivot relatively to the said member and the catch device is released from the relevant drive element and the carrier is by-passed by the latter.

10. A conveyer system comprising, in combination, a trackway, a linear drive means extending along and below the upper part of said trackway and having drive elements regularly spaced therealong, means for effecting different strokes of reciprocatory travel to said drive means, and a plurality of carriers adapted to run along said trackway in guided fashion and each having a pivoted catch device comprising a member pivotally mounted upon the carrier for turning movement upwardly and downwardly upon the latter and being normally constrained downwardly, said member having an extremity projecting downwardly of the carrier and in the form of a ramp, and a transverse blade pivotally mounted upon said member adjacent one end thereof and normally constrained into a position for engagement with said drive elements on said drive means, whereby when the said drive means is travelling in one direction each carrier is coupled thereto by co-operation of the catch device thereof with one of said drive elements and when the drive means is travelling in the opposite direction the blade can pivot relatively to the said member and the catch device is released from the relevant drive element and the carrier is by-passed by the latter and should said first-mentioned carrier approach a preceding stationary carrier said ramp of said first-mentioned carrier will be engaged by said preceding carrier and pivot said member relatively to said carrier thereby to disengage the blade and hence the carrier from the drive means.

11. A conveyer system comprising, in combination, a trackway, a linear drive means extending along and below the upper part of said trackway and having drive elements at intervals therealong, means for effecting different strokes of reciprocatory travel to the respective drive means, and a plurality of carriers adapted to run along said trackway in guided fashsion and each having a pivoted catch device comprising a member pivotally mounted upon the carrier for turning movement upwardly and downwardly upon the latter and being normally constrained downwardly and a transverse blade pivotally mounted upon said member adjacent one end thereof and normally constrained into a position for engagement with said driving elements on said driving means, each of said carriers incorporating a spring associated with said blade and adapted to urge the latter into a driving position, whereby when the said drive means is travelling in one direction each carrier is coupled thereto by co-operation of the catch device thereof with one of said drive elements and when the drive means is travelling in the opposite direction the blade can pivot relatively to the said member and the catch device is released from the relevant drive element and the carrier is by-passed by the latter and under normal conditions the carrier will be driven along the trackway by said drive means but should there be an obstruction resisting movement of the carrier upon the load exceeding the predetermined loading of said spring the blade will turn from its driving position against the action of said spring and will be disengaged from the relevant drive element.

12. A conveyer system comprising, in combination, a trackway extending along the full length of the conveyer path, a main section of edge-up strip formed at its upper edge with ratchet teeth regularly spaced therealong and extending adjacent said trackway for the full length of said conveyer path, a power unit, means connected to said power unit for effecting different strokes of reciprocatory travel to said main strip section, a plurality of auxiliary sections of edge-up strip located in zones along said path and each being formed at its upper edge with ratchet teeth spaced therealong said auxiliary strips being of the same depth as the main strip and being guided for longitudinal reciprocatory sliding movement relatively to said trackway, the upper edge of each of said auxiliary sections of driving strip being located at a higher level than the upper edge of the main section of driving strip, further means for driving each of the said auxiliary strips from said main strip section with a lost motion imparting from said power unit to each of said sections a reciprocatory travel, and a plurality of carriers adapted to run along said trackway in guided fashion and each having a pivoted catch device arranged to co-operate with said teeth of any of said strip sections whereby when a carrier is in one of said zones and the relevant one of said auxiliary strip sections is travelling in one direction said carrier is coupled thereto by co-operation of the catch device thereof with one of said teeth irrespective of movement of said main strip section and when the said auxiliary strip section is travelling in the opposite direction the catch device is released from the relevant tooth and the carrier is bypassed by the teeth, and when a carrier is located along the conveyer path between said zones when the main strip section is travelling in one direction said carrier is coupled thereto by co-operation of the catch device thereof with one of said teeth and when said main strip section is travelling in the opposite direction the catch device is released from the relevant tooth, the carriers being driven along portions of the trackway associated with said auxiliary strip sections at slower speeds than along the portions of the trackway between said auxiliary sections.

References Cited by the Examiner

UNITED STATES PATENTS

| | | | |
|---|---|---|---|
| 761,484 | 5/04 | Hetzel | 104—172 |
| 780,348 | 1/05 | Jackman | 104—172 |
| 797,610 | 8/05 | Schaefer | 104—172 |
| 2,619,916 | 12/52 | Rainier | 104—172 |
| 2,869,560 | 1/59 | Finston | 104—162 X |
| 2,885,969 | 5/59 | Kay et al. | 104—172 |
| 3,055,313 | 9/62 | Stoll et al. | 104—162 |

ARTHUR L. LA POINT, *Primary Examiner.*

MILTON BUCHLER, *Examiner.*